US010931556B2

United States Patent
Sella et al.

(10) Patent No.: US 10,931,556 B2
(45) Date of Patent: *Feb. 23, 2021

(54) SAMPLING PACKETS TO MEASURE NETWORK PERFORMANCE

(71) Applicant: LEVEL 3 COMMUNICATIONS, LLC, Broomfield, CO (US)

(72) Inventors: William Thomas Sella, Parker, CO (US); James Michael Sella, Parker, CO (US)

(73) Assignee: Level 3 Communications, LLC, Broomfield, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/960,033

(22) Filed: Apr. 23, 2018

(65) Prior Publication Data

US 2018/0241659 A1   Aug. 23, 2018

Related U.S. Application Data

(63) Continuation of application No. 14/678,687, filed on Apr. 3, 2015, now Pat. No. 9,954,756.

(Continued)

(51) Int. Cl.
*H04W 72/04* (2009.01)
*H04L 12/26* (2006.01)

(52) U.S. Cl.
CPC ............ *H04L 43/12* (2013.01); *H04L 43/026* (2013.01); *H04L 43/087* (2013.01);
(Continued)

(58) Field of Classification Search
CPC .... H04W 24/08; H04L 43/10; H04L 43/0852; H04L 43/087; H04L 43/026;
(Continued)

(56) References Cited

U.S. PATENT DOCUMENTS

| 7,508,769 B1 | 3/2009 | Duffield et al. |
| 2007/0147258 A1 | 6/2007 | Mottishaw et al. |

(Continued)

FOREIGN PATENT DOCUMENTS

| CN | 101056215 B | 4/2011 |
| EP | 1548980 | 6/2005 |

(Continued)

OTHER PUBLICATIONS

Extended European Search Report, dated May 2, 2018, Application No. 15846132.7, filed Sep. 22, 2015 , 8 pgs.

(Continued)

*Primary Examiner* — Ricardo H Castaneyra

(57) ABSTRACT

Disclosed are system, method, and computer-readable medium embodiments for a network to provide network applications and services and estimate network metrics for individual applications and services. In an embodiment, a first routing device receives a packet and determines that the packet is to be sampled. The first routing device samples the packet by storing first information associated with the packet and transmits the first information to a measurement server. The first routing device transmits the packet towards a destination according to routing information. A second routing device receives the packet and determines that the packet is to be sampled. The second routing device samples the packet by storing second information associated with the packet and transmitting the second information to the measurement server. The measurement server determines a measurement based on the first information and second information.

20 Claims, 5 Drawing Sheets

Related U.S. Application Data

(60) Provisional application No. 62/057,290, filed on Sep. 30, 2014.

(52) U.S. Cl.
CPC ...... *H04L 43/0852* (2013.01); *H04L 43/0888* (2013.01); *H04L 43/0894* (2013.01); *H04L 43/106* (2013.01)

(58) Field of Classification Search
CPC ... H04L 43/106; H04L 43/12; H04L 43/0888; H04L 43/0894; H04L 43/0984; H04L 43/50; H04L 65/80; H04L 69/22; H04L 29/06; H04L 41/5009
See application file for complete search history.

(56) References Cited

U.S. PATENT DOCUMENTS

| | | | |
|---|---|---|---|
| 2009/0109858 A1 | 4/2009 | Yamasaki et al. | |
| 2010/0265838 A1 | 10/2010 | Yamasaki | |
| 2013/0294259 A1 | 11/2013 | Lee | |
| 2014/0119214 A1* | 5/2014 | Jeon | H04L 43/50 370/252 |
| 2015/0063158 A1 | 3/2015 | Nedeltchev | |
| 2016/0094430 A1 | 3/2016 | Sella et al. | |

FOREIGN PATENT DOCUMENTS

| | | |
|---|---|---|
| EP | 2498445 | 9/2012 |
| JP | 2008182433 | 8/2008 |
| JP | 2011004333 | 1/2011 |
| WO | WO-2007118396 | 10/2007 |

OTHER PUBLICATIONS

International Preliminary Report on Patentability, dated Apr. 4, 2017, Int'l Appl. No. PCT/US15/051530, Int'l Filing Date Sep. 22, 2015; 5 pgs.

International Search Report dated Dec. 11, 2015, Int'l Appl. No. PCT/US15/051530; Int'l Filing Date Sep. 22, 2015; 3 pgs.

Singapore Written Opinion, dated Jan. 16, 2018, Application No. 11201702600W, filed Sep. 22, 2015; 6 pgs.

Written Opinion of the International Searching Authority dated Dec. 11, 2015, Int'l Appl. No. PCT/US15/051530; Int'l Filing Date Sep. 22, 2015; 4 pgs.

Japan Notice of Reasons for Rejection, dated Jun. 27, 2019, Application No. 2017-517076, filed Sep. 22, 2015; 13 pgs.

European Examination Report, dated Apr. 25, 2019, Application No. 15846132.7, filed Sep. 22, 2015; 5 pgs.

Chinese Second Official Action, dated Jan. 15, 2020, Application No. 201580052850.9, filed Sep. 22, 2015; 16 pgs.

Chinese Examination Report, dated Aug. 1, 2019, Application No. 201580052850.9, filed Sep. 22, 2015; 15 pgs.

Japanese Notice of Reasons for Refusal, dated Dec. 10, 2019, Application No. 2017-517076, filed Sep. 22, 2015; 7 pgs.

\* cited by examiner

SAMPLING PACKETS TO MEASURE NETWORK PERFORMANCE

BACKGROUND

Technical Field

Embodiments generally relate to network services.

Background

Networks may provide connections between clients subject to service level agreements (SLAs) specifying characteristics and performance guarantees. For example, clients may establish a virtual Ethernet connection with a specified dedicated bandwidth.

Networks may also provide clients with statistics, reports, and other information related to the performance of the services. For example, clients may wish to see how much their traffic is delayed by the network, whether the service is meeting SLAs, whether the network is causing a bottleneck, etc. Typically, the endpoints in a network connection can measure end-to-end network metrics (e.g., response time, throughput, jitter). However, by measuring network performance from the endpoints the clients may not know what portion of the path is causing any delays, or whether a particular service employed is performing satisfactorily.

To estimate traffic performance (response time, throughput, jitter), many utilities do not track the traffic itself. Instead, they transmit additional packets that run alongside the regular network traffic and measure how the network transmits those packets.

While this may have some benefits, it may not always be accurate because the network may handle different packets in different ways. Also, by transmitting additional packets, these utilities put additional load on the network, affecting its performance.

Also, these utilities measure overall traffic flowing through its network components. However, traditional approaches are unable to measure network performance on a per application or per service basis.

SUMMARY

In view of the above, it would be advantageous to provide improved mechanisms for individually estimating network application metrics.

In an embodiment, a network provides network applications and services and estimates network metrics for individual applications and services. In an embodiment, a first routing device receives a packet and determines that the packet is to be sampled. The first routing device samples the packet by storing first information associated with the packet and transmits the first information to a measurement server. The first routing device transmits the packet towards a destination according to routing information. A second routing device receives the packet and determines that the packet is to be sampled. The second routing device samples the packet by storing second information associated with the packet and transmitting the second information to the measurement server. The measurement server determines a measurement based on the first information and second information.

Method and computer-readable medium embodiments are also disclosed.

Further embodiments and features, as well as the structure and operation of the various embodiments, are described in detail below with reference to accompanying drawings.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

In embodiments, a network provides network applications and services and estimates network metrics for individual applications and services.

Figure 1:
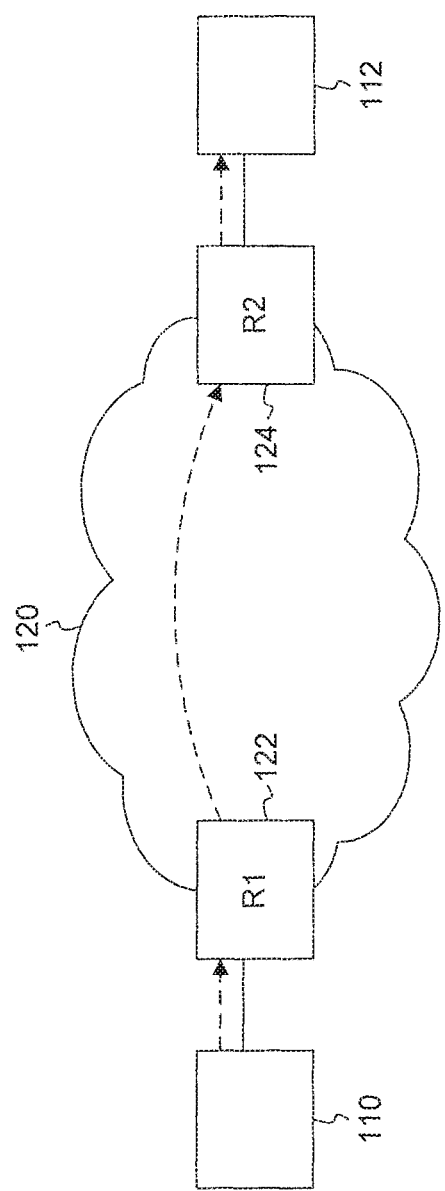
FIG. 1 shows a diagram illustrating a network environment for providing a network application, according to an example embodiment.

FIG. 1 shows a diagram illustrating a network environment 100 for providing a network application, according to an example embodiment.

Network environment 100 includes example endpoints 110 and 112 communicating through a network 120. Network 120 include edge routing devices 122 and 124. Endpoints 110 and 112 communicate with edge routing devices 122 and 124, respectively, to access to network 120.

Example endpoints 110 and 112 can be one or more client computing devices that utilize services of network 120. Endpoints 110 and 112 can be, by way of example, local area networks (LANs), computers, mobile devices, servers, clusters, etc. In an example, endpoints 110 and 112 may themselves be networks and may use network 120 as a transit network to communicate with each other, as illustrated by the dashed arrows in FIG. 1.

Network 120 can be a network configured to transmit data between client computing devices, such as, for example, personal computers, servers, mobile devices, local area networks (LANs), etc. In an embodiment, network 120 is a wide area network (WAN) or a metropolitan area network (MAN). In an embodiment, network 120 provides virtual networking services, such as, for example, virtual Ethernet connections, virtual local area networks (VLANs), virtual private networks (VPNs), etc. For example, network 120 can provide a virtual circuit with dedicated bandwidth for data communications between clients in remote locations. Network 120 may utilize any point-to-point, point-to-multipoint, or multipoint-to-multipoint networking protocols. Network access protocols used may include, for example, Ethernet, Asynchronous Transfer Mode (ATM), High-Level Data Link Control (HDLC), Frame Relay, Synchronous Optical Networking (SONET)/Synchronous Digital Hierarchy (SDH), Internet Protocol (IP), Transmission Control Protocol (TCP), User Datagram Protocol (UDP), Multiprotocol Label Switching (MPLS), etc.

Network 120 provides network communications between multiple endpoints. In an embodiment, network 120 provides configurable data communications services to multiple endpoints for a service fee.

The term "routing device" as applied herein includes both network layer routers and data link layer switches. Routing devices 122 and 124 may be configured to provide connectivity services, such as, for example, virtual Ethernet connections, MPLS tunneling, VLAN routing, service level agreements (SLAs), etc. A connectivity service may provide a connection from at least two geographically disparate computers. Network 120 may provide connections at a particular level of service, such as a particular level of bandwidth, latency, or jitter.

Example edge routing devices 122 and 124 are entry points for endpoints 110 and 112 into network 120. Network 120 may include a plurality of additional routing devices and other network elements that transmit data between multiple endpoints. In an embodiment, network 120 gathers and provides measurements describing the performance of services provided by network 120. Network managers may find it desirable to provide a client with statistics regarding the performance of the services network 120 provides to a client, such as, for example, throughput, packet loss, latency, etc. In an embodiment, these statistics are gathered on a per service basis. For example, a client may procure a virtual Ethernet connection between endpoints 110 and 112. Network 120 may want to measure traffic associated with the virtual Ethernet connection in order to assess the performance of the connection and report to the client how well the service is performing. In this manner, network 120 may inform clients how well network 120 is performing in providing a particular service.

Figure 2:
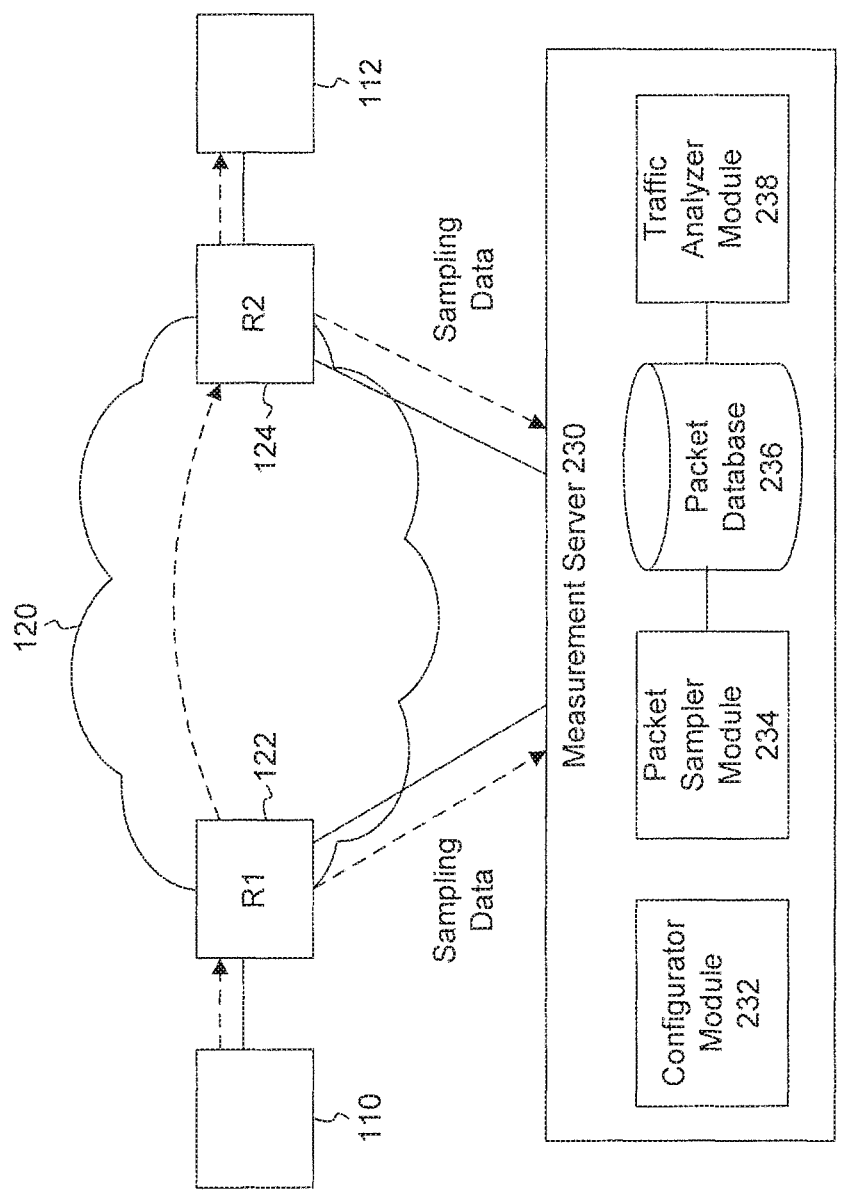
FIG. 2 shows a diagram illustrating network environment incorporating a measurement server for estimating network metrics for individual application and services, according to an example embodiment.

FIG. 2 shows a diagram illustrating network environment 100 incorporating a measurement server for estimating network metrics for individual application and services, according to an example embodiment.

Measurement server 230 may configure and communicate with network routing devices to measure statistics associated with network services. For example, measurement server 230 configures network routing devices to communicate information about packets associated with a particular service. In an embodiment, measurement server 230 configures edge routers to communicate identifying information associated with a service packet and a timestamp indicating the time the packet arrived at the particular edge router. Measurement server 230 can then use this information to determine network metrics of the service.

In an embodiment, measurement server 230 comprises a configurator module 232, a packet sampler module, 234, a packet database 236, and a traffic analyzer module 238.

Configurator module 232 instructs and configures routing devices 122 and 124 to sample packets and transmit sampled packet to measurement server 230. For example, configurator module may instruct the routing devices to sample packets determined to meet a particular criteria. Configurator module 232 may also configure the routing devices to transmit measurement server 230 information identifying the sampled packets and timestamps indicating when the respective routing devices received the sampled packets.

Packet sampler module 234 receives the identifying information associated with the service packets and timestamps, and stores the information and timestamps in the packet database 236.

Traffic analyzer module 238 analyzes the received sample packet information to determine network performance and statistics. For example, traffic analyzer module 238 may query packet database 236 for information corresponding to the same packet. Traffic analyzer module 238 may then compare the entry and exit timestamps of the packet to determine a performance measurement.

In an example, network 120 establishes a virtual Ethernet connection service between endpoints 110 and 112. Measurement server 230 may configure edge routing devices 122 and 124 to transmit identifying information of a packet and a timestamp of when the routing device received the packet. For example, when routing device 122 receives a packet from endpoint 110 directed to endpoint 112, routing device 122 may send identifying information for the packet and timestamp to measurement server 120. In this manner, measurement server 230 may know the time the packet entered network 120. Measurement server 230 may also configure edge routing devices 122 and 124 to transmit identifying information for the same packet and a timestamp of when the routing device received the packet in an exit point from network 120. In this manner, measurement server 230 may know the time the packet exited network 120. Measurement server 230 may then use the timestamp information to measure metrics associated with the service.

Measurement server 230 may use various techniques to configure routing devices to identify and timestamp packets. In an embodiment, measurement server 230 configures edge routing devices to encapsulate service packets entering network 120 with a sampling header that uniquely identifies the packet. The routing device then transmits packet and timestamp information to measurement server 210. When the packet reaches an edge routing device on the way out of network 120, the routing device recognizes the sampling header and sends the identifying and timestamp information.

In another embodiment, measurement server 230 configures routing devices to apply a hash function to service packets. The routing devices may send identifying and timestamp information about packets that hash to one or more predetermined values. Since the hash function would yield the same value for the same packet, the edge routing devices can sample the same packets on the edge points of network 120. In an embodiment, the edge routing devices apply the hash function to a portion of service packets that does not change along the route, such as, for example, source and destination addresses and ports, a portion of the payload, a packet sequence number, etc.

As mentioned, sampling data communicated from the edge routing devices to the measurement server includes packet identifying information and a timestamp. Packet identifying information may include any portion of the packet that distinguishes the packet from other packets. In an embodiment, the identifying information is applied by an edge routing device by applying an additional header. In an embodiment, the identifying information is a portion of the packet, such as a portion of the header, or a portion of the payload, or any combination of these. The identifying information may or may not uniquely identify the packet, that is, it may be possible for two packets to have the same identifying information.

Entry and exit point edge routing devices may be arbitrarily defined to obtain performance statistics for any network. For example, a network administrator may define the network, or portion of a network, for which performance statistics are desired and configure edge routing devices accordingly.

Figure 3:
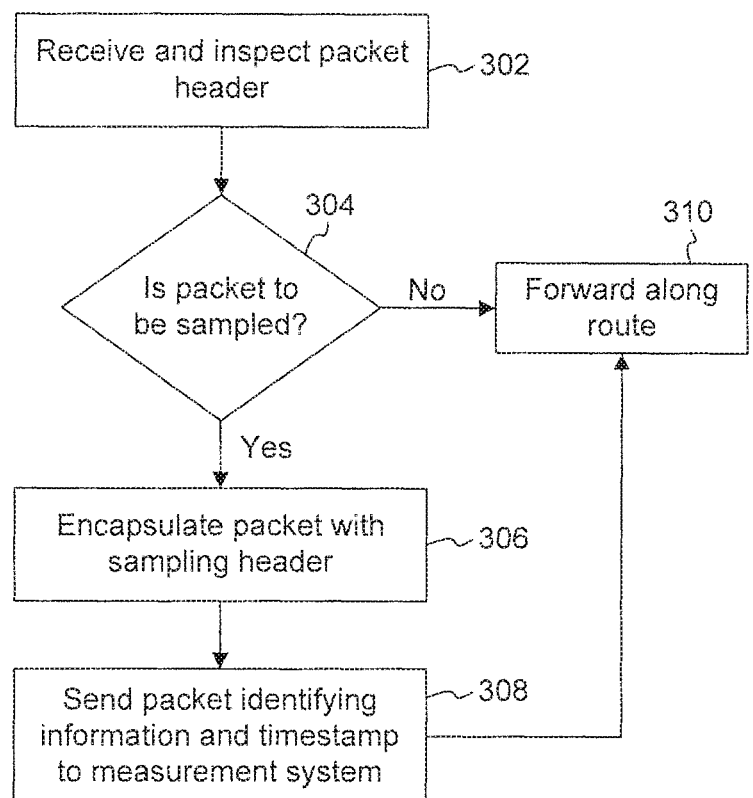
FIG. 3 is a flowchart describing a method for estimating network metrics for individual application and services by encapsulating packets at an edge routing device, according to an example embodiment.

FIG. 3 is a flowchart describing a method 300 for estimating network metrics for individual application and services by encapsulating packets at an edge routing device, according to an example embodiment.

At step 302, a network entry point edge routing device receives a packet entering the network. The routing device inspects the packet header to determine whether the packet is to be sampled. The routing device may use any mechanism to determine whether a packet is to be sampled, such as, for example, selecting packets to or from particular addresses, network protocols, meeting criteria (such as having a particular hash or modulus value), or at random. In an embodiment, routing device is configured to select packets associated with a specified network service or application.

As shown in steps 304 and 310, if the packet is not to be sampled, the routing device forwards the packet to the next hop along the route. If the packet is to be sampled, the routing device encapsulates the packet with a sampling header, as shown in step 306. The sampling header may serve as an indication for another routing device that the packet is to be sampled at the exit end of the network. The routing device may generate an identifier and include in the sampling header may contain an identifier for the packet. In another example, the sampling header contains a value that indicates that the packet should be sampled, and the routing device uses other packet data as the identifying information.

At step 308, the routing device sends the sampling data, including packet identifying information and timestamp, to the measurement server. Finally, at step 310, the routing devices forwards the encapsulated packet to the next hop in the route.

Figure 4:
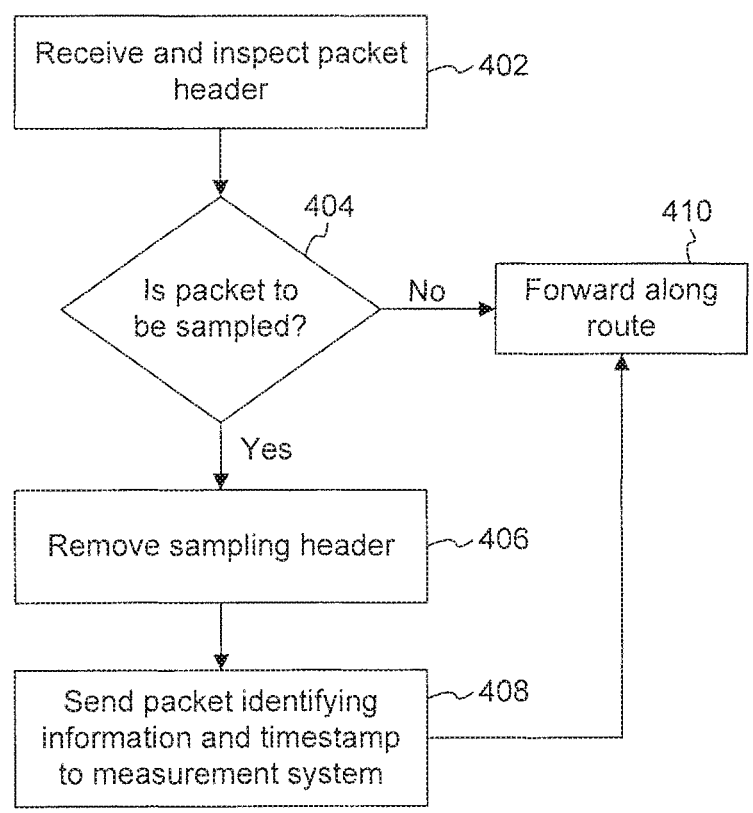
FIG. 4 is a flowchart describing a method for estimating network metrics for individual application and services by receiving encapsulated packets at an edge routing device, according to an example embodiment.

FIG. 4 is a flowchart describing a method 400 for estimating network metrics for individual application and services by receiving encapsulated packets at an edge routing device, according to an example embodiment.

At step 402, a network exit point edge routing device receives a packet from another element in the network. The routing device inspects the packet header to determine whether the packet is to be sampled by determining whether the packet contains a sampling header.

As shown in steps 404 and 410, if the packet is not to be sampled, the routing device forwards the packet towards the destination endpoint. If the packet is to be sampled, the routing device removes the sampling header from the packet, as shown in step 406.

At step 408, the routing device sends the sampling data, including packet identifying information and timestamp, to the measurement server. Because the measurement server also received sampling data from the entry point routing device, as described above reference to method 300, the measurement server information regarding the timing of packet's traversal through the network.

Finally, at step 410, the routing devices forwards the packet towards the destination endpoint.

Figure 5:
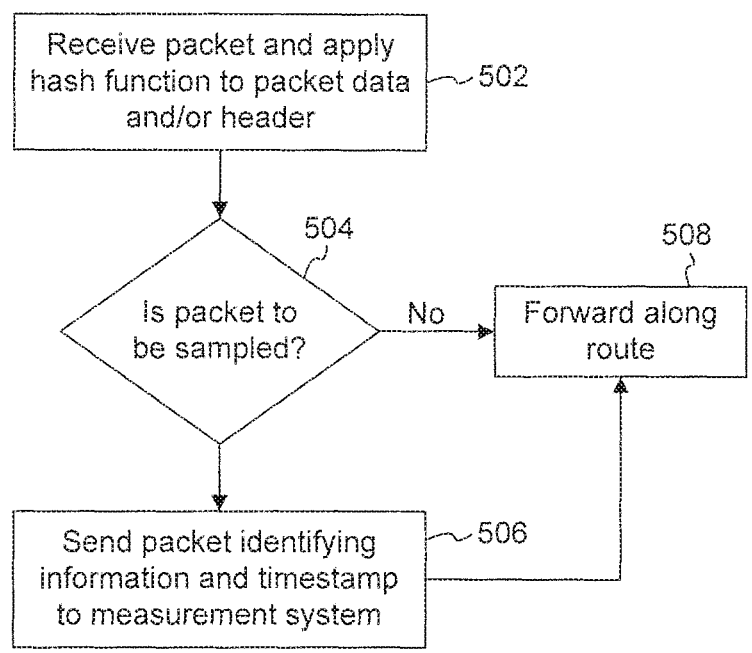
FIG. 5 is a flowchart describing a method for estimating network metrics for individual application and services by applying a hash function at an edge routing device, according to an example embodiment.

FIG. 5 is a flowchart describing a method 500 for estimating network metrics for individual application and services by applying a hash function at an edge routing device, according to an example embodiment.

At step 502, an edge routing device receives a packet and applies a hash function to at least a portion of the packet. The hash function may be applied to any portion of the packet that does not change across hops in the route, so that the same packet has the same hash result at different edge routing devices.

At step 504, the routing devices determines based on the hash result whether the packet is to be sampled. The routing device may be configured to sample packets whose hash result has one or more specified values, or range of values.

If the packet is not to be sampled, the routing device forwards the packet to the next hop along the route, or to the destination endpoint, as shown in step 508. If the packet is to be sampled, the routing device sends sampling data, including packet identifying information and timestamp to the measurement server, as described in step 506.

Finally, the routing device forwards the packet to the next hop along the route, or to the destination endpoint, as shown in step 508.

CONCLUSION

Measurement server 230 may be any stored type of structured memory, including a persistent memory. In examples, the measurement server may be part of network 120, or may be a separate system in communication with network 120.

Each of the blocks and modules in FIGS. 1 and 2 may be implemented in hardware, software, firmware, or any combination thereof.

Each of the blocks and modules in FIGS. 1 and 2 may be implemented on the same or different computing devices. Such computing devices can include, but are not limited to, a personal computer, a mobile device such as a mobile phone, workstation, embedded system, game console, television, set-top box, or any other computing device. Further, a computing device can include, but is not limited to, a device having a processor and memory, including a non-transitory memory, for executing and storing instructions. The memory may tangibly embody the data and program instructions. Software may include one or more applications and an operating system. Hardware can include, but is not limited to, a processor, memory, and graphical user interface display. The computing device may also have multiple processors and multiple shared or separate memory components. For example, the computing device may be a part of or the entirety of a clustered computing environment or server farm.

Identifiers, such as "(a)," "(b)," "(i)," "(ii)," etc., are sometimes used for different elements or steps. These identifiers are used for clarity and do not necessarily designate an order for the elements or steps.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present embodiments should not be limited by any of the above-described examples, but should be defined only in accordance with the following claims and their equivalents.

What is claimed is:

1. A method of measuring network performance comprising:
   receiving a packet at a first routing device;
   detecting, by the first routing device, a first value included in the packet, the first value comprising a device address or a network protocol;
   encapsulating, based on the detection of the first value in the packet, the packet with a sampling header, wherein the sampling header indicates to a second routing device that the packet is to be sampled;
   sampling, by the first routing device, the packet by storing first information associated with the packet;
   transmitting, by the first routing device, the first information to a measurement server;
   transmitting, by the first routing device, the packet towards a destination according to routing information;
   receiving the packet at the second routing device;
   determining, by the second routing device, that the packet is to be sampled based on the sampling header;
   sampling, by the second routing device, the packet by storing second information associated with the packet;
   transmitting, by the second routing device, the second information to the measurement server;
   before transmitting by the second routing device the second information to the measurement server, removing the sampling header from the packet; and
   determining, by the measurement server, a performance measurement based on the first information and second information,
   wherein the sampling header is associated with a specified network service or application.

2. The method as recited in claim 1, further comprising detecting a second value in the sampling header.

3. The method as recited in claim 2, further comprising detecting the second value in at least one of a source port, a destination port, and a packet sequence number.

4. The method as recited in claim 1, wherein determining at the first routing device that the packet is to be sampled comprises: performing a hash function on at least a portion of the packet associated with the first value; and determining a result of the hash function satisfies a condition.

5. The method as recited in claim 1, wherein the first information comprises a timestamp and at least a portion of the packet, wherein the packet comprises a first header, and wherein encapsulating the packet with the sampling header comprises adding the sampling header to the packet as a second header.

6. The method as recited in claim 5, wherein the at least the portion of the packet comprises at least one of a portion of a header and a portion of a payload.

7. The method as recited in claim 1, wherein the measurement comprises at least one of a latency, a throughput, a jitter, a packet rate, and a frame rate.

8. A system for measuring network performance, comprising:
   a first routing device configured to:
   receive a packet;
   detect a first value included in the packet, the first value comprising a device address or a network protocol;
   encapsulate, based on the detection of the first value in the packet, the packet with a sampling header, wherein the sampling header indicates that the packet is to be sampled;
   sample the packet by storing first information associated with the packet;
   transmit the first information to a measurement server; and
   transmit the packet towards a destination according to routing information;
   a second routing device configured to:
   receive the packet at the second routing device;
   determine that the packet is to be sampled based on the sampling header;
   sample the packet by storing second information associated with the packet; and
   transmit the second information to the measurement server;
   before transmitting by the second routing device the second information to the measurement server, removing the sampling header from the packet; and
   the measurement server configured to determine a performance measurement based on the first information and second information,
   wherein the sampling header is associated with a specified network service or application.

9. The system as recited in claim 8, wherein the second routing device is further configured to: determine that the packet is to be sampled by detecting a second value in the sampling header.

10. The system as recited in claim 9, wherein the detecting the second value in the sampling header comprises detecting the second value in at least one of a source port, a destination port, and a packet sequence number, wherein the packet comprises a first header, and wherein encapsulating the packet with the sampling header comprises adding the sampling header to the packet as a second header.

11. The system as recited in claim 8, wherein the first routing device is further configured to: determine that the packet is to be sampled by performing a hash function on at least a portion of the packet, the at least a portion of the packet associated with the first value; and determining a result of the hash function satisfies a condition.

12. The system as recited in claim 8, wherein the first information comprises a timestamp and at least a portion of the packet.

13. The system as recited in claim 12, wherein the at least the portion of the packet comprises at least one of a portion of a header and a portion of a payload.

14. The system as recited in claim 8, wherein the measurement comprises at least one of a latency, a throughput, a jitter, a packet rate, and a frame rate.

15. A non-transitory computer-readable medium having instructions stored thereon that, when executed by at least one computing device, causes the at least one computing device to perform operations for measuring network performance, the operations comprising:
   receiving a packet at a first routing device;
   detecting, by the first routing device, a first value included in the packet, the first value comprising a device address or a network protocol;
   sampling, by the first routing device, the packet by storing first information associated with the packet;
   encapsulating, by the first routing device and based on the detection of the first value in the packet, the packet with a sampling header, wherein the sampling header indicates to a second routing device that the packet is to be sampled;

transmitting, by the first routing device, the first information to a measurement server;

transmitting, by the first routing device, the packet towards a destination according to routing information;

receiving the packet at the second routing device;

determining, by the second routing device, that the packet is to be sampled based on the sampling header;

sampling, by the second routing device, the packet by storing second information associated with the packet;

transmitting, by the second routing device, the second information to the measurement server;

before transmitting by the second routing device the second information to the measurement server, removing the sampling header from the packet; and determining, by the measurement server, a performance measurement based on the first information and second information, wherein the sampling header is associated with a specified network service or application.

16. The computer-readable medium as recited in claim 15, the operations further comprising:

detecting a second value in the sampling header.

17. The computer-readable medium as recited in claim 16, wherein the detecting the second value in the sampling header comprises detecting the second value in at least one of a source port a destination port, and a packet sequence number, wherein the packet comprises a first header, and wherein encapsulating the packet with the sampling header comprises adding the sampling header to the packet as a second header.

18. The computer-readable medium as recited in claim 15, the operations further comprising:

determining at the first routing device that the packet is to be sampled by performing a hash function on at least a portion of the packet associated with the first value; and determining a result of the hash function satisfies a condition.

19. The computer-readable medium as recited in claim 15, wherein the first information comprises a timestamp and at least a portion of the packet, and wherein the at least the portion of the packet comprises at least one of a portion of a header and a portion of a payload.

20. The computer-readable medium as recited in claim 15, wherein the measurement comprises at least one of a latency, a throughput, a jitter, a packet rate, and a frame rate.

* * * * *